United States Patent [19]

King

[11] Patent Number: 5,005,372
[45] Date of Patent: Apr. 9, 1991

[54] AIR CONDITIONER UNIT FOR MOUNTING ON OR IN THE ROOF OF A VEHICLE

[75] Inventor: Donald D. King, Chanhassen, Minn.

[73] Assignee: Thermo King Corporation, Minneapolis, Minn.

[21] Appl. No.: 515,970

[22] Filed: Apr. 27, 1990

[51] Int. Cl.⁵ ............................................. B60H 1/32
[52] U.S. Cl. .................... 62/244; 62/DIG. 16
[58] Field of Search ................ 62/DIG. 16, 244, 239, 62/259.1

[56] References Cited

U.S. PATENT DOCUMENTS

| | | | |
|---|---|---|---|
| 4,628,702 | 12/1986 | Boxum | 62/DIG. 16 |
| 4,835,982 | 6/1989 | Ferdows | 62/239 |
| 4,905,478 | 3/1990 | Matsuda et al. | 62/DIG. 16 |
| 4,926,655 | 5/1990 | King | 62/DIG. 16 |

Primary Examiner—William E. Tapolcai
Attorney, Agent, or Firm—D. R. Lackey

[57] ABSTRACT

An air conditioner unit mounted on or within the roof of a vehicle. The frame of the unit functions as a substantially flat support pan for the air conditioning components, while having a lower portion which accommodates a generic curved contour of most vehicles the unit will be associated with, such as buses. The frame is devoid of upstanding wall portions on the sides adjacent to the sides of the vehicle, and on the ends of the frame which approach the sides. This frame structure facilitates the manufacture of the frame, the assembly of components on the frame, and servicing of the unit, and it enables the manufacturer of the vehicle to provide a bubble or skin for the air conditioner unit which accommodates the design and aesthetics of the vehicle.

5 Claims, 3 Drawing Sheets

AIR CONDITIONER UNIT FOR MOUNTING ON OR IN THE ROOF OF A VEHICLE

TECHNICAL FIELD

The invention relates in general to air conditioner units, and more specifically to an air conditioner unit suitable for mounting on or within the roof of a vehicle, such as a bus.

BACKGROUND ART

Air conditioner units for mounting on or within the roof of a vehicle typically spread the condenser and evaporator functions into two or more separate packages, requiring considerable roof space as well as creating air drag. Roof mounted air conditioner units which incorporate both the evaporator and condenser functions in a single package limit coil surface area, particularly condenser coil surface area, limiting the capacity of the unit.

My co-pending application Ser. No. 07/345,854, filed May 1, 1989, now U.S. Pat. No. 4,926,655, entitled "Air Conditioner Unit Suitable For Mounting On Roof Of A Vehicle", describes an air conditioner unit primarily suitable for roof mounting which includes both evaporator and condenser functions in a single compact package having a length dimension small enough to enable the unit to be mounted between any two adjacent structural beams of a vehicle, at the front, back, or intermediate the front and back of the vehicle, while providing sufficient evaporator and condenser coil surface area in the single package to enable the unit to satisfy the cooling demands of a typical transit bus. The supporting frame of the unit encloses and completely surrounds the components of the unit, separating them via upstanding peripheral and intermediate wall portions, dictating a fixed outer configuration for the unit as well as a fixed cover design.

It would be desirable and it is an object of the present invention to be able to adapt the single compact air conditioner component layout of my co-pending application to vehicles having a curved roof and curved roof supports, and to also make the unit adaptable to mounting within the roof of a vehicle as well as on the roof of a vehicle.

SUMMARY OF THE INVENTION

Briefly, the present invention is a new and improved air conditioner unit which utilizes the same component layout as in my co-pending application, but which mounts the components on an entirely different frame. The new and improved frame enables the unit to be mounted on, or within, the roof of a vehicle having a curved top and curved roof support trusses; it enables the frame to be manufactured easier and with thirteen fewer parts than the frame of my co-pending application; it facilitates the mounting of the refrigeration components, refrigeration tubing, and electrical wiring on the frame; it facilitates installing, maintaining and servicing the unit; and it also enables the manufacturer of the associated vehicle to design and provide an outer skin or bubble for the unit, which includes a cover, which is aesthetically related to the design of the vehicle.

The frame provides the complete structural support for the components, and thus the type of cover, skin or bubble provided over the unit is not important from a structural viewpoint. The manufacturer of the vehicle need only know the outer dimensions of the unit, critical sealing interfaces, and the clearance height, with there being no other points to coordinate with dimensionally. The maximum clearance height of the frame is only as high as required by the components themselves, with the sides of the frame which are adjacent to the sides of the associated vehicle being devoid of any upstanding wall portions, as are portions of the frame ends which are adjacent to and which intersect with the sides of the frame. Thus, instead of being box shaped, having a plurality of upstanding wall portions which form open ended cubicles for the various components, the frame is in the form of a support pan, having a horizontally oriented intermediate portion for the condenser sections, and having first and second horizontally oriented lateral portions for the evaporator sections. The new frame structure makes it easier to weld frame components together, as the weld seams are easily accessible to the welder; the new frame structure makes it easier to assemble and fix the refrigeration components, refrigeration piping and electrical wiring to the frame since the assemblers do not have to reach inside of box-like cubicles formed by a plurality of upstanding wall portions; and, the frame structure makes all of the unit's components more accessible for servicing and maintenance purposes.

Further, the side edges of the frame are dropped below the level of the intermediate portion of the frame, to accommodate a vehicle's bowed roof support beams or struts which aid in supporting the frame, enabling the unit cover, skin or bubble to flow upwardly from the sides of the vehicle and into the lines of the vehicle's roof structure without abrupt changes which create drag and which may be unpleasing from an aesthetic viewpoint.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
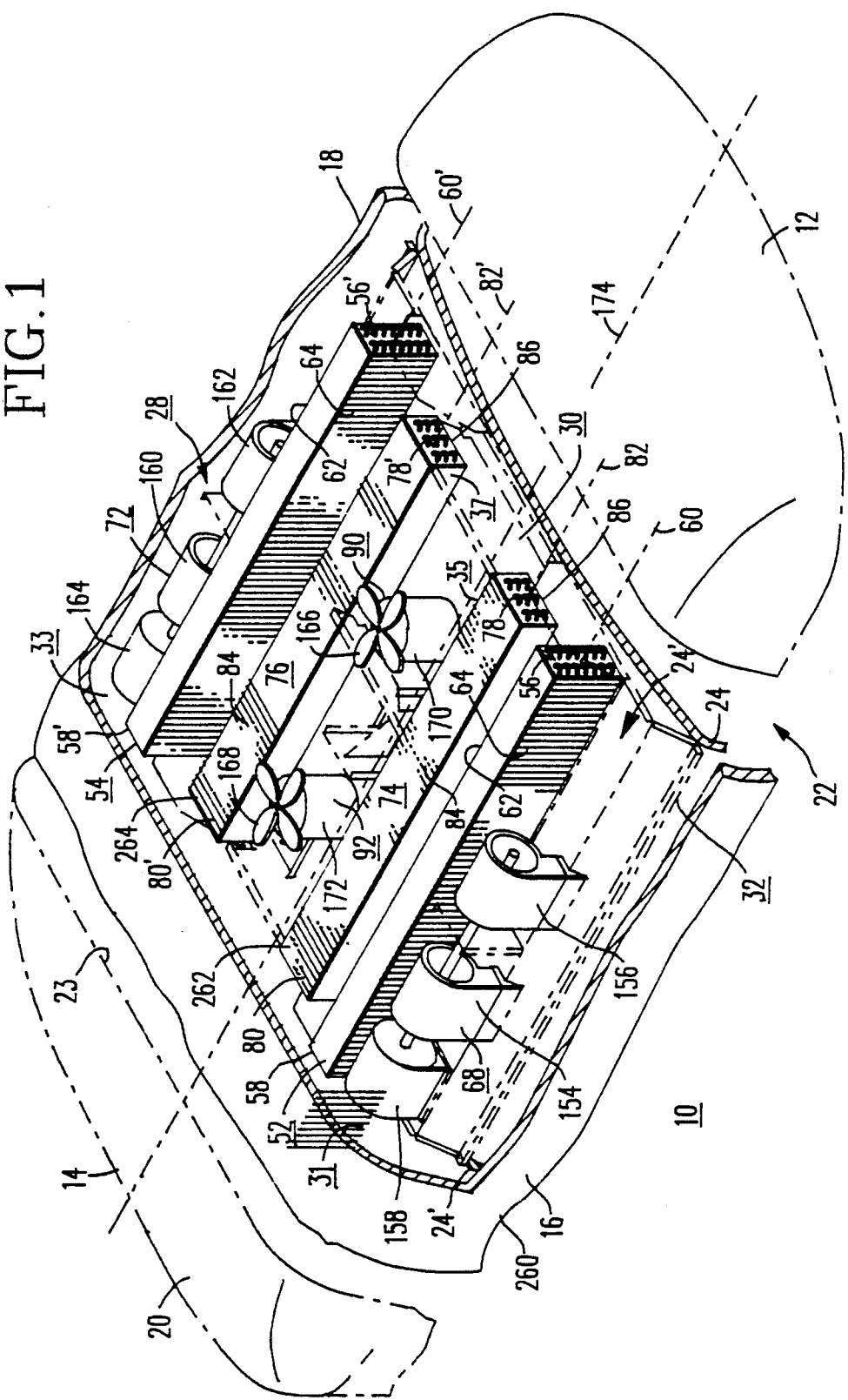
FIG. 1 is perspective view of an air conditioning unit constructed according to the teachings of the invention, mounted within the roof structure of a vehicle, with the refrigeration components shown in solid and the outline of the frame in phantom.

Since the components, and component layout are essentially the same as in my hereinbefore mentioned U.S. Pat. No. 4,926,655, said patent is hereby incorporated into the specification of the present application by reference. Like reference numerals are used for like components to facilitate reference to the incorporated patent.

Referring now to the drawings, and to FIG. 1 in particular, there is shown a vehicle 10, such as a bus, having a front 12, back 14, first and second sides 16 and 18, respectively, a roof 20, and a passenger compartment 22. The bus structure, which supports a curved outer skin 23, includes a plurality of curved or bowed struts or beams, such as beams 24 and 24', which are typically spaced about 50 inches (1270 mm) apart from the front 12 to the back 14 of the bus 10. Horizontal structural members (not shown) extend between the curved beams 24 and 24'.

Bus 10 includes an air conditioner system 28 comprising a single air conditioner unit 30 and either a power pack with compressor, or a compressor driven by the bus main engine (not shown).

Air conditioner unit 30 is mounted on, or within, the roof 20 of bus 10 by any suitable mounting means, with unit 30 extending between and securely fixed to any two adjacent support struts or beams 24 and 24'. Unit 30 may be mounted adjacent the front 12 of bus 10, adjacent the rear 14, or intermediate the front and rear, as desired.

Air conditioner unit 30 includes a frame 32, to be hereinafter described in detail, on which the refrigeration components of air conditioner unit 30 are mounted. Air conditioner unit 30 includes an evaporator function in the form of first and second evaporator sections 31 and 33 having elongated evaporator coils 52 and 54, respectively. Evaporator coil 52 has first and second ends 56 and 58, a longitudinal axis 60 which extends between the ends, and major opposed air entry and exit face planes 62 and 64, respectively. Evaporator coil 54 is of like construction and its components are identified with like reference numerals with a prime mark.

Evaporator sections 31 and 33 further include first and second evaporator air delivery assemblies 68 and 72, respectively. The first evaporator air delivery assembly 68 preferably includes first and second forward curve, double inlet, centrifugal blowers 154 and 156 driven by an electric motor 158. In like manner, the second evaporator air delivery assembly 72 includes first and second centrifugal blowers 160 and 162 driven by an electric motor 164.

Air conditioner unit 30 includes a condenser function in the form of first and second condenser sections 35 and 37 having elongated condenser coils 74 and 76. Condenser coil 74 has first and second ends 78 and 80, a longitudinal axis 82 which extends between the ends, and major opposed air flow face planes 84 and 86, respectively. Condenser coil 76 is of like construction and its components are identified with like reference numerals with a prime mark.

The condenser function further includes first and second condenser air delivery assemblies 90 and 92. The first and second condenser air delivery assemblies 90 and 92 include axial flow fans having fan blades 166 and 168 respectively driven by electric motors 170 and 172.

Figure 2:
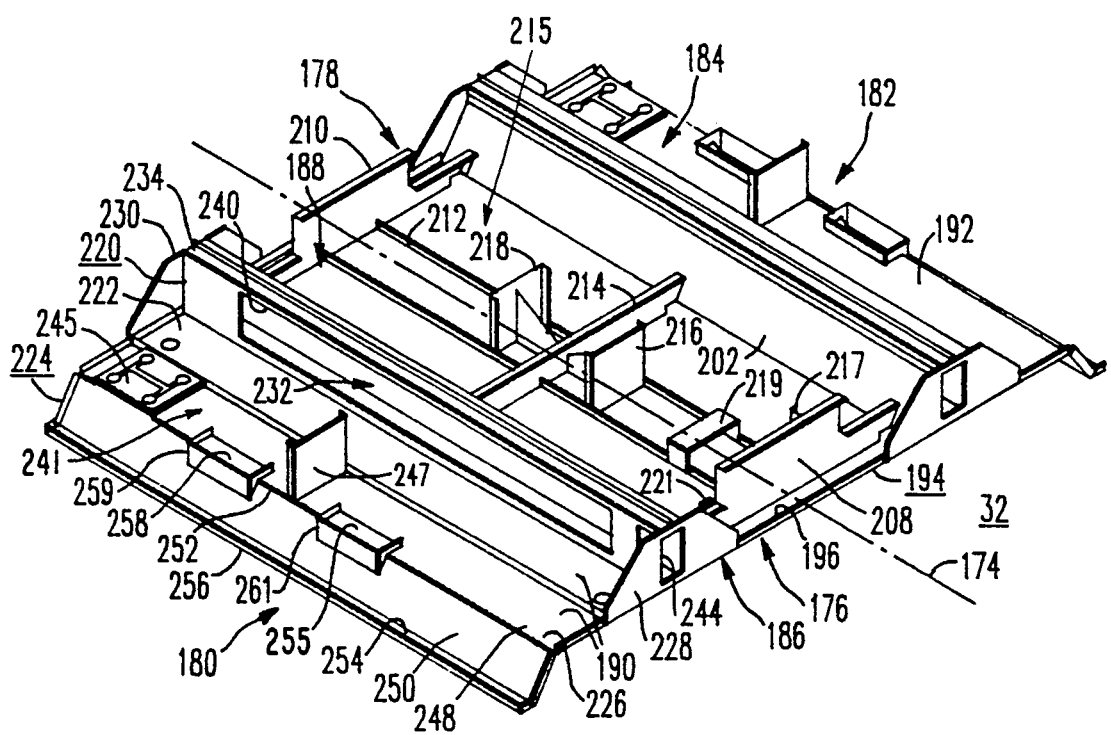
FIG. 2 is a perspective view of the frame, shown in phantom in FIG. 1, without the refrigeration components mounted thereon.
Figure 3:
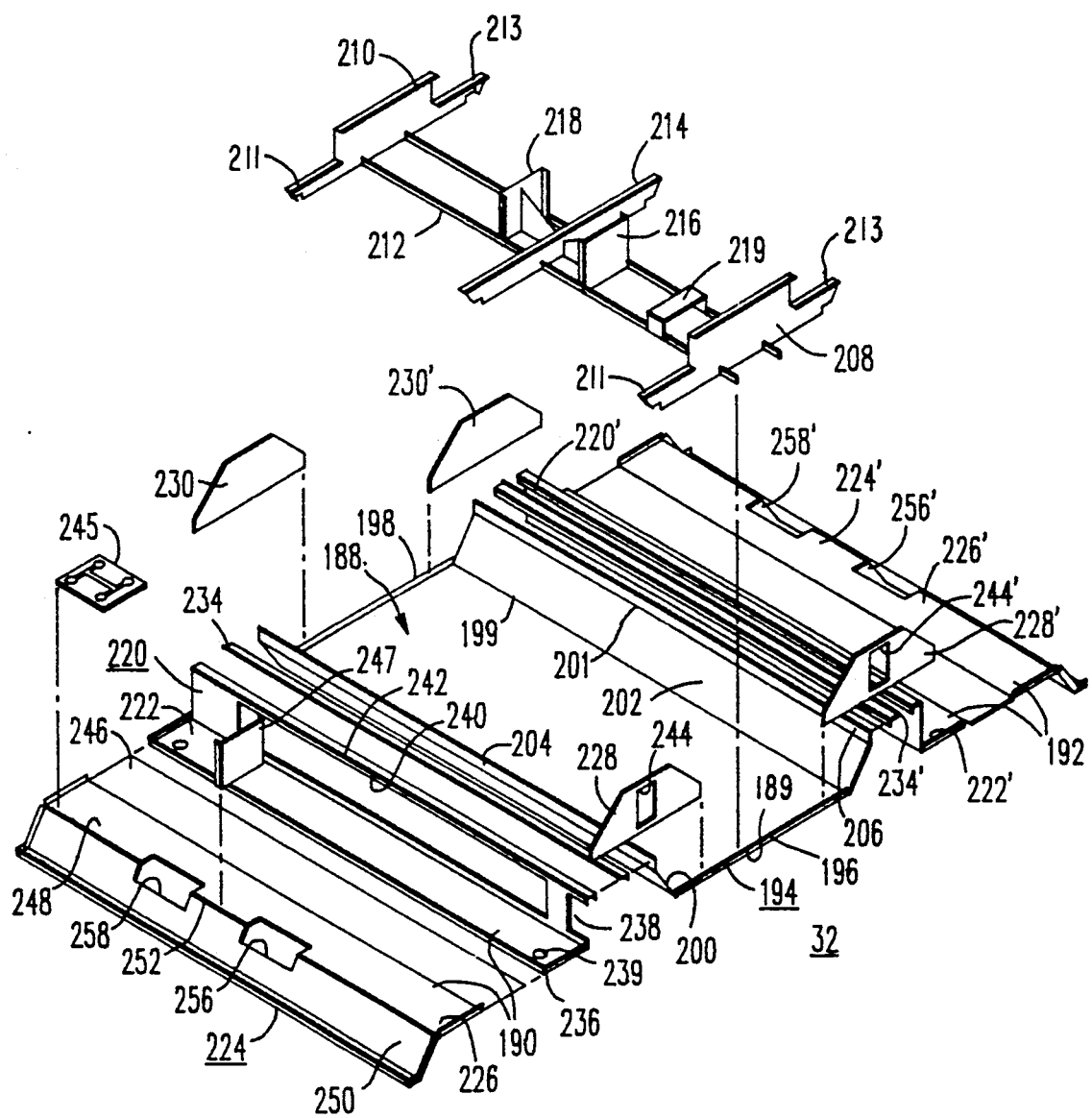
FIG. 3 is an exploded perspective view of the frame shown in FIGS. 1 and 2, setting forth a preferred group of frame elements for assembling the frame.

Frame 32, as best shown in FIGS. 2 and 3, is constructed of a plurality of metallic elements, such as aluminum, welded together to form a light but high strength structure having a longitudinal axis 174, first and second longitudinal ends 176 and 178, first and second sides 180 and 182, a top 184 and a bottom 186. Frame 32, which is of substantially like construction on each side of axis 174, thus has an outer periphery bounded by the first and second ends 176 and 178 and first and second sides 180 and 182.

Frame 32 includes a central or intermediate, substantially flat, upwardly facing support surface 188 for supporting the condenser function, including both condenser sections 35 and 37 and the first and second condenser air delivery assemblies 90 and 92. Frame 32 further includes first and second substantially flat, upwardly facing lateral support surfaces 190 and 192 for supporting the evaporator function, i.e., the first and second evaporator sections 31 and 33, including the first and second evaporator coils 52 and 54, and the first and second evaporator air delivery assemblies 68 and 72.

The intermediate support surface 188 is preferably formed from a substantially flat rectangularly configured metallic sheet member 194 having the support surface 188 and a lower surface 189. Sheet member 194 also has upturned edges 196 and 198 along opposite sides of the rectangular configuration, which edges lie along longitudinal ends 176 and 178 of frame 32, respectively. The remaining opposite edges of sheet member 194 are each bent along first longitudinally extending bend lines, such as bend line 199, to form upwardly sloped portions 200 and 202 which slope upwardly at predetermined like obtuse angles from the flat intermediate support surface 188. The remaining opposite edges of sheet member 194 are each further bent along second longitudinally extending bend lines, such as bend line 201, to form upstanding portions 204 and 206 which form predetermined like obtuse angles with portions 200 and 202, respectively. The predetermined angles are selected such that portions 204 and 206 are oriented perpendicular to the plane of the flat major support surface 188.

First and second upstanding end wall members 208 and 210 are fixed to the intermediate support surface 188 adjacent to the upturned edges 196 and 198. Wall members 208 and 210 cooperate with the first and second upturned, upwardly sloped portions 200 and 202, to define a condenser plenum 215. Wall members 208 and 210 are configured to provide support surfaces 211 and 213 for condenser coils 74 and 76. A longitudinally extending channel member 212 is fixed to support surface 188, to provide a longitudinal reinforcing rib for the flat support surface 188. A centrally located transversely extending support member 214 extends across support surface 188 and is fixed to support surface and to each of the sloping side portions 200 and 202.

Support member 214 provides intermediate support for the elongated condenser coils 74 and 76; and, the end walls 208 and 210, along with intermediate support member 214, all add transverse rigidity to frame 32. Upstanding motor mounts 216 and 218 are provided for condenser fan motors 170 and 172, respectively. Brackets 217, 219 and 221, best shown in FIG. 2, are also fixed to support surface 188, for mounting refrigeration components, such as a refrigerant receiver and dryer.

The support surfaces 190 for the first evaporator section 31 are formed by a plurality of cooperative frame elements, including a right angle member 220 which provides a combination support surface and evaporator pan 222 for evaporator coil 52, a member 224 which includes a flat support surface 226 for supporting the first evaporator air delivery assembly 68, first and second upstanding end walls 228 and 230, respectively, and an elongated strip member 234. The first and second end walls 228 and 230 and the strip member 234 cooperate with right angle member 220 and the upwardly bent portions 200 and 204 of intermediate member 194 in forming an evaporator return air plenum 232.

More specifically, right angle member 220 includes first and second leg portions 236 and 238, with leg portion 236 being a horizontally oriented portion which defines the evaporator coil support surface 222. The edges of the first leg portion 236 which do not adjoin the second leg portion 238 are turned upwardly to define a pan for containing and directing evaporator condensation to drain openings in surface 222, such as opening 239. The second leg portion 238 extends vertically upward, and it defines a major opening 240 therein which enables air returning from the vehicle 10 to flow from the evaporator return air plenum 232, through the evaporator coil 52, to an evaporator discharge air plenum 241, and then to air delivery assembly 68. The portion of the second leg portion 238 which is close to the uppermost edge is bent horizontally outward and then downward, forming a substantially horizontally oriented weld surface 242. The elongated strip 234 is welded to weld surface 242 and to portion 204 of the intermediate support member 194, spacing the upwardly slanted portion 200 of sheet member 194 from the second leg portion 238 of right angle member 220 to form the hereinbefore mentioned evaporator air intake plenum 232. The upstanding end wall members 228 and 230 are welded to the ends of the frame elements which define plenum 232, to complete the evaporator air intake plenum 232. Wall 228 is illustrated with an opening 244 which may cooperate with a damper (not shown) to admit fresh or outside air into plenum 232, for controlled mixing the return air from the vehicle 10.

Member 224 includes a first horizontally oriented portion 246 which extends below and is welded to the first leg portion 236 of right angle member 220. This metallic "sandwich" provides additional strength for frame 32 where evaporator coil 52 is mounted, and it also provides firm support for a second horizontally oriented portion 248 of member 224 which defines the hereinbefore mentioned support surface 226 upon which the evaporator air delivery assembly 68 is mounted. A motor mounting plate 245 is fixed to support surface 226 near one longitudinal end of frame 32, and an upwardly standing bearing mount 247 is fixed near the longitudinal midpoint of surface 226.

Member 224 continues from the second horizontally oriented portion 248 to a portion 250 which slopes downwardly from portion 248 via a bend line 252 which forms a predetermined obtuse angle between portions 248 and 250. The predetermined angle is selected such that a support flange 254 formed adjacent to an outermost edge 255 of member 224 is spaced a predetermined dimension below the lower surface 189 of intermediate frame portion 188. This predetermined dimension is selected to accommodate the generic curve of curved top vehicles, permitting the frame to be supported by the longitudinally spaced support struts 24 and 24' of the vehicle 10, and horizontally oriented stringers which extend between the longitudinally spaced struts, while enabling the center of the frame 32 to clear the crown of the struts. Openings 256 and 258 are provided in adjoining portions 248 and 250 of member 224 over which the outlets of evaporator blowers 156 and 154 are mounted via suitable interface adapters 259 and 261, such that evaporator conditioned air may be drawn from the conditioned air plenum 241 and discharged into distribution ducts within vehicle 10.

The portion of frame 32 which extends laterally from the longitudinal axis 174 to the second lateral support surfaces 192 is the same as hereinbefore described relative to the frame portion which extends from longitudinal axis 174 to the first lateral support surfaces 190. Like elements on opposite lateral sides of the frame are given like reference numerals in the drawing, with the addition of a prime mark on the side related to the second lateral support surfaces 192.

It will be noted that the joints between the frame elements, and thus all of the welds between the various elements of frame 32 may be easily reached by a welder, as they may be accessed without reaching into dead-end, box-like cubicles which characterize most air conditioning frames of the prior art. It will also be noted that mounting of the refrigeration components, tubing, and wiring is facilitated for the same reason, with the various mounting elements and mounting holes for receiving mounting hardware being easily accessed from above the frame without the necessity of reaching into open ended cubicles or boxes. The evaporator coils 52 and 54 are merely placed into position upon support surfaces 222 and 222' and bolted. The various elements of the evaporator air delivery assemblies 68 and 72 are placed upon their support surfaces 226 and 226', interconnected, and bolted into aligned position. The condenser coils 74 and 76 are placed upon the condenser coil supports formed by the end walls 208 and 210 and the intermediate support element 214 and bolted. The motors 170 and 174 of the condenser air delivery assemblies 90 and 92 are bolted to their upstanding motor mounts 216 and 218.

An outer skin, bubble, or cover 260 completes air conditioning unit 30, with the cover 260 covering the entire unit 30, including frame 32. The cover 260 is intentionally not shown in full, as it is a feature of the invention that the cover may take many different configurations. Since the cover 260 completely covers the frame 32, the frame 32 need not be painted, as it will not be visible when installed in vehicle 10. A generic cover may be provided by the manufacturer of air conditioning unit 30, or the cover may be provided by the manufacturer of the vehicle, as desired. It will be noted that the sides 180 and 182 of frame 32 are entirely devoid of upstanding wall portions, as are the first and second ends 176 and 178 for substantial portions thereof adjacent to the sides 180 and 182 of the frame 32. Thus, cover 260 may be designed to flow smoothly upward from the sides 16 and 18 of vehicle 10, and follow the curved roof line of the vehicle. It is merely necessary to provide openings in the cover for receiving incoming condenser air, and for discharging heated condenser air. In a preferred embodiment, the condenser air flow path is such that cool ambient air is drawn vertically downward by the condenser air assemblies 90 and 92, and forced upwardly through the condenser coils 74 and 76, as this assures cool air flow over the motors 168 and 170. However, the fan blades 166 and 168 may be constructed to pull air downwardly through the condenser coils 74 and 76, and to discharge heated condenser air vertically upward from the fan blades 166 and 168. Fan guards (not shown) are preferably provided with the air conditioning unit 30. The cover 260 will also be configured to complete the conditioned evaporator air plenums, such as plenum 241.

I claim:

1. An air conditioner unit mounted on or within the roof of a vehicle, with the vehicle having a front and back, first and second sides, and a longitudinal axis which extends between the front and back, comprising:
   a plurality of refrigeration components, including first and second condenser sections and first and second evaporator sections,
   and a frame for supporting said refrigeration components,
   said frame having an outer periphery which includes first and second longitudinal ends, and a longitudinal axis between the first and second longitudinal ends which is parallel with the longitudinal axis of the vehicle, said outer periphery of the frame further including first and second side edges which are adjacent the first and second sides, respectively, of the vehicle, said frame including an intermediate section which defines a substantially flat upwardly facing intermediate support surface which extends between the first and second ends of the frame, in inwardly spaced relation from the first and second edges of the frame, said intermediate support surface supporting said first and second condenser sections, said intermediate section further including first and second upturned side portions which extend between the first and second longitudinal ends of the frame, first and second upstanding walls on said intermediate section disposed adjacent to the first and second longitudinal ends of the frame, which cooperate with the upturned side portions of the intermediate section to define a condenser plenum, said frame further defining first and second substantially flat upwardly facing lateral support surfaces respectively adjacent to the first and second side edges of the frame, said first and second lateral support surfaces respectively supporting said first and second evaporator sections, a major portion of the outer periphery of said frame being devoid of upstanding wall portions, including the entire first and second edges of the frame, and portions of the first and second longitudinal ends of the frame.

2. The air conditioner unit of claim 1 wherein the portions of the first and second longitudinal ends of the frame which are devoid of upstanding wall portions include portions adjacent to the first and second evaporator sections.

3. The air conditioner unit of claim 1 wherein each of the first and second upstanding walls define a first support surface for the first condenser section and a second support surface for the second condenser section.

4. The air conditioner unit of claim 1 wherein the frame includes first and second lateral portions which define the first and second lateral support surfaces, with said first and second lateral portions each further including an upstanding apertured wall portion which extends between the first and second longitudinal ends of the frame and cooperates with an upturned side of the intermediate section to define first and second return air plenums for air to be conditioned by the first and second evaporator sections.

5. An air conditioner unit mounted on or within the roof of a vehicle, with the vehicle having a front and back, first and second sides, and a longitudinal axis which extends between the front and back, comprising:

a plurality of refrigeration components, including first and second condenser sections and first and second evaporator sections, and a frame for supporting said refrigeration components, said frame having an outer periphery which includes first and second longitudinal ends, and a longitudinal axis between the first and second longitudinal ends which is parallel with the longitudinal axis of the vehicle, said outer periphery of the frame further including first and second side edges which are adjacent the first and second sides, respectively, of the vehicle, said frame including an intermediate section which defines a substantially flat, upwardly facing, intermediate support surface and a lower surface, said intermediate support surface extending between the first and second ends of the frame, in inwardly spaced relation from the first and second edges of the frame, said intermediate support surface supporting said first and second condenser sections, said frame further defining first and second substantially flat upwardly facing lateral support surfaces respectively adjacent to the first and second side edges of the frame, said first and second lateral support surfaces respectively supporting said first and second evaporator sections, a major portion of the outer periphery of said frame being devoid of upstanding wall portions, including the entire first and second edges of the frame, and portions of the first and second longitudinal ends of the frame, and wherein the vehicle has a plurality of bowed roof supports disposed in spaced relation between the front and back of the vehicle, at least two of which aid in supporting the frame, with the first and second side edges of the frame being equally spaced below the lower surface of said intermediate section, to accommodate crowns of the bowed roof supports.

* * * * *